US012450991B2

(12) United States Patent
Westburg et al.

(10) Patent No.: US 12,450,991 B2
(45) Date of Patent: Oct. 21, 2025

(54) HAPTICS MIXING FOR CONCURRENT HAPTIC EVENTS

(71) Applicant: QUALCOMM Incorporated, San Diego, CA (US)

(72) Inventors: Reid Westburg, Del Mar, CA (US); Sandeep Louis D'Souza, San Diego, CA (US); Murali Mantravadi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 166 days.

(21) Appl. No.: 18/511,415

(22) Filed: Nov. 16, 2023

(65) Prior Publication Data

US 2025/0166472 A1    May 22, 2025

(51) Int. Cl.
*G08B 6/00* (2006.01)
*G06F 3/01* (2006.01)
*G08B 21/00* (2006.01)

(52) U.S. Cl.
CPC ............ *G08B 6/00* (2013.01); *G06F 3/016* (2013.01)

(58) Field of Classification Search
CPC .. G08B 6/00; G08B 3/01; G08B 21/00; G06F 3/016
See application file for complete search history.

(56) References Cited

U.S. PATENT DOCUMENTS

| 11,132,062 | B2 * | 9/2021 | Bajaj | H02P 7/025 |
|---|---|---|---|---|
| 2019/0221087 | A1 * | 7/2019 | Cruz-Hernandez | G10L 21/06 |
| 2023/0249064 | A1 * | 8/2023 | Murphy | A63F 13/22 463/30 |
| 2024/0373081 | A1 * | 11/2024 | Sodagar | H04N 21/435 |

FOREIGN PATENT DOCUMENTS

| EP | 2136286 A2 | 12/2009 |
| EP | 3447612 A1 | 2/2019 |
| EP | 2624099 B1 | 11/2019 |

OTHER PUBLICATIONS

International Search Report and Written Opinion—PCT/US2024/048582—ISA/EPO—Dec. 16, 2024.

* cited by examiner

*Primary Examiner* — Toan N Pham
(74) *Attorney, Agent, or Firm* — QUALCOMM Incorporated

(57) ABSTRACT

In some aspects, an electronic device may receive a plurality of haptic signals associated with a plurality of haptic events, wherein the plurality of haptic events overlap in a time domain. The electronic device may generate a mixed haptics signal that combines the plurality of haptic signals in a mechanical acceleration domain, wherein the mixed haptics signal preserves timing or synchronization information associated with the plurality of haptic signals. The electronic device may generate an output stream to be provided to a haptic actuator, wherein the output stream includes a pulse code modulation (PCM) voltage signal based on the mixed haptics signal that combines the plurality of haptic signals. Numerous other aspects are described.

30 Claims, 6 Drawing Sheets

HAPTICS MIXING FOR CONCURRENT HAPTIC EVENTS

FIELD OF THE DISCLOSURE

Aspects of the present disclosure generally relate to haptic feedback and, for example, to haptics mixing for concurrent haptic events.

BACKGROUND

Haptic technology, sometimes referred to as kinesthetic technology or three-dimensional (3D) touch technology, can create an experience of touch (e.g., a tactile experience) by applying forces, vibrations, motions, or other feedback (e.g., physical or mechanical outputs) that produce user-perceptible tactile sensations. For example, haptic technologies can be used to simulate a sensation of touching an object in a virtual environment (e.g., in an extended reality application), may be used to provide haptic feedback or tactile indications in a control system, and/or may be used to provide a physical or tactile element to music, among many other use cases. In some cases, haptic technologies may incorporate tactile sensors that can measure forces that a user exerts on an interface and/or may incorporate tactile actuators that can generate forces that a user perceives on an interface.

SUMMARY

Some aspects described herein relate to a method for haptics mixing by an electronic device. The method may include receiving a plurality of haptic signals associated with a plurality of haptic events, wherein the plurality of haptic events overlap in a time domain. The method may include generating a mixed haptics signal that combines the plurality of haptic signals in a mechanical acceleration domain, wherein the mixed haptics signal preserves timing or synchronization information associated with the plurality of haptic signals. The method may include generating an output stream to be provided to a haptic actuator, wherein the output stream includes a pulse code modulation (PCM) voltage signal based on the mixed haptics signal that combines the plurality of haptic signals.

Some aspects described herein relate to an electronic device for wireless communication. The electronic device may include one or more memories and one or more processors coupled to the one or more memories. The one or more processors may be configured to receive a plurality of haptic signals associated with a plurality of haptic events, wherein the plurality of haptic events overlap in a time domain. The one or more processors may be configured to generate a mixed haptics signal that combines the plurality of haptic signals in a mechanical acceleration domain, wherein the mixed haptics signal preserves timing or synchronization information associated with the plurality of haptic signals. The one or more processors may be configured to generate an output stream to be provided to a haptic actuator, wherein the output stream includes a PCM voltage signal based on the mixed haptics signal that combines the plurality of haptic signals.

Some aspects described herein relate to a non-transitory computer-readable medium that stores a set of instructions. The set of instructions, when executed by one or more processors of an electronic device, may cause the electronic device to receive a plurality of haptic signals associated with a plurality of haptic events, wherein the plurality of haptic events overlap in a time domain. The set of instructions, when executed by one or more processors of the electronic device, may cause the electronic device to generate a mixed haptics signal that combines the plurality of haptic signals in a mechanical acceleration domain, wherein the mixed haptics signal preserves timing or synchronization information associated with the plurality of haptic signals. The set of instructions, when executed by one or more processors of the electronic device, may cause the one electronic device to generate an output stream to be provided to a haptic actuator, wherein the output stream includes a PCM voltage signal based on the mixed haptics signal that combines the plurality of haptic signals.

Some aspects described herein relate to an apparatus for wireless communication. The apparatus may include means for receiving a plurality of haptic signals associated with a plurality of haptic events, wherein the plurality of haptic events overlap in a time domain. The apparatus may include means for generating a mixed haptics signal that combines the plurality of haptic signals in a mechanical acceleration domain, wherein the mixed haptics signal preserves timing or synchronization information associated with the plurality of haptic signals. The apparatus may include means for generating an output stream to be provided to a haptic actuator, wherein the output stream includes a PCM voltage signal based on the mixed haptics signal that combines the plurality of haptic signals.

Aspects generally include a method, apparatus, system, computer program product, non-transitory computer-readable medium, electronic device, haptic device user device, user equipment, wireless communication device, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
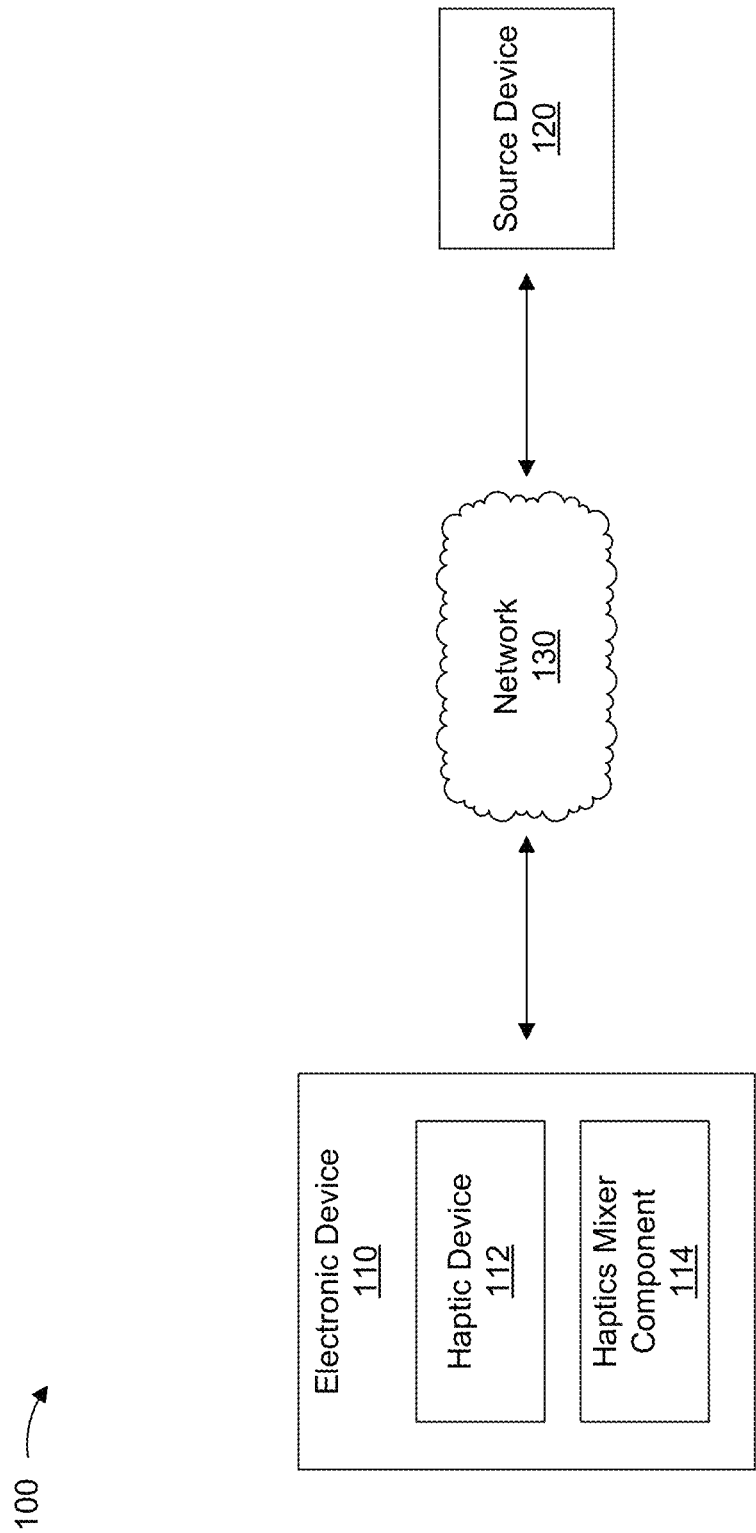
FIG. 1 is a diagram illustrating an example environment that includes one or more devices that may support haptics mixing for concurrent haptic events, in accordance with the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Haptic feedback is a tactile feedback technology that recreates the sense of touch by applying user-perceptible forces, vibrations, or motions to an electronic device. Haptic feedback is typically designed to enhance a user experience by providing physical sensations that simulate interactions with real-world objects. Haptic feedback technologies are typically integrated into electronic devices, such as smartphones, gaming controllers, wearable devices, and virtual reality systems, and are generally designed to provide users with a more immersive and engaging experience. For example, through the use of actuators, sensors, and algorithms, haptic feedback technology can generate various tactile sensations, including vibrations, pulses, textures, and forces, to convey information or simulate physical interactions. By incorporating haptic feedback into user interfaces, devices can provide subtle cues, notifications, or responses, enhancing the overall usability and interactivity of the technology. As haptic technology continues to advance, there has been a growing focus on creating more nuanced and realistic haptic experiences, leading to applications in fields such as gaming, virtual reality, healthcare, and/or automotive interfaces, among other examples.

However, one issue that arises in haptic feedback systems is that haptics signals are typically defined according to unique parametric constraints and/or linear resonant actuator (LRA)-specific voltage waveforms that are directly applied to a hardware-based LRA. For example, existing haptics are typically voltage waveforms that are generated or otherwise designed by LRA vendors such that the voltage waveforms are pretuned to the underlying hardware, and are therefore not portable from one device to another or from one LRA or haptic device to another LRA or haptic device. Accordingly, haptic feedback systems generally lack standardized and/or consistent techniques to handle concurrent haptic events that fully or partially overlap in a time domain (e.g., a first haptic event lasting a particular duration occurs, and a second haptic event is triggered at some point during the first haptic event). In cases where a first haptic event and a second haptic event overlap in the time domain, one approach that is often used in haptic feedback systems is to terminate playback of a first waveform corresponding to the first haptic event and start playback of a second waveform corresponding to the second haptic event. Alternatively, another approach used in haptic feedback systems is to simply ignore or discard the second haptic event. In either case, the user experience does not match what the user expects in terms of tactile haptic feedback, there may be discontinuities in haptic waveforms and/or degraded waveform quality, and/or user experiences may be inconsistent among different devices and/or platforms that support haptic feedback.

Accordingly, some aspects described herein relate to techniques to enable haptics mixing for concurrent haptic events. For example, as described herein, an electronic device that supports haptic feedback may include a haptics mixer component that may receive and combine multiple concurrent and asynchronous haptic events and/or signals and/or audio-derived haptic signals. For example, in some aspects, the multiple concurrent and asynchronous haptic events may include one or more discrete haptic events, which may correspond to predefined haptic waveforms from one or more sources (e.g., an explosion, a gunshot, a jump, or an item acquisition in a gaming application), where the discrete haptic events may be associated with descriptive waveform designer (WFD) parameters, such as a scene position and/or weighting, which may be derived from haptic event data in the form of one or more piecewise linear (PWL) or pulse code modulation (PCM) acceleration-based segments.

Additionally, or alternatively, the haptic events that are mixed or otherwise combined may include one or more audio-to-haptic events that are derived from an audio stream. In some aspects, the haptics mixer component may generate an output signal associated with an LRA-independent mechanical acceleration format that may facilitate upstream intelligent mixing. For example, haptic events may be processed regardless of other concurrent haptic events or audio-to-haptic events, and the mixed haptics output may be provided in a format that supports continuous low-latency haptics to an LRA that renders the mixed haptics output. For example, the mixed haptics output format may be LRA device independent and therefore portable across haptics platforms. Furthermore, the smart haptics mixing may support multiple output streams (e.g., one output stream per destination LRA) in a haptics platform that includes multiple LRAs. In addition, as described herein, the mixed haptics output may use configuration data that is programmable by an original equipment manufacturer (OEM), such as the number of haptic devices and mounting location(s) needed to route multiple mixed outputs to different LRAs in a haptics platform. In this way, some aspects described herein may provide techniques for combining concurrent haptic event vibrations, may enable consistent behavior across platforms in cases where there is haptic event concurrency, and/or may provide natural and expected user experiences for concurrent haptic events.

FIG. 1 is a diagram illustrating an example environment that includes one or more devices that may support haptics mixing for concurrent haptic events, in accordance with the present disclosure. As shown in FIG. 1, the environment 100 may include an electronic device 110, a source device 120, and a network 130. Devices of the environment 100 may interconnect via wired connections, wireless connections, or a combination of wired and wireless connections.

The electronic device 110 includes one or more devices capable of receiving, generating, storing, processing, and/or providing information related to haptics mixing for concurrent haptic events. For example, in some aspects, the electronic device 110 may include a haptic device 112 that can generate a playback waveform for generating haptic feedback, as described herein. For example, the haptic device 112 may include one or more devices that can receive a playback waveform and convert the playback waveform into haptic feedback, a haptic response, or another type of haptic output. For example, the haptic device 112 may include a linear resonance actuator, an eccentric rotating mass motor, a piezoelectric actuator, and/or another type of haptic device capable of receiving a playback waveform as an input and generating a vibration output or pattern, force feedback, ultrasonic-induced pressure, or another type of haptic feedback or output based at least in part on the playback waveform. In some aspects, the electronic device 110 may include a communication device and/or a computing device, such as a user equipment (e.g., a smartphone or a radiotelephone), a laptop computer, a tablet computer, a handheld computer, a wearable communication device (e.g., a smart wristwatch, a pair of smart eyeglasses, or the like), a gaming device (e.g., a video game console, a handheld game device, a wearable gaming device, a video game controller, or the like), a virtual reality device, an augmented reality device, an extended reality device, an Internet of Things (IoT) device, or a similar type of device.

The source device 120 includes one or more devices capable of receiving, generating, storing, processing, and/or providing information related to haptics mixing for concurrent haptic events. For example, the source device 120 may include any suitable device or combination of devices that can generate one or more haptic events, such as audio-synchronous (e.g., music-based) haptics, gaming haptics, phone or device alerts, ringtones, and/or other suitable haptic events. In some aspects, the source device 120 may be separate from the electronic device 110, or the source device 120 may include the electronic device. For example, in some aspects, the source device 120 may be a user equipment, a laptop computer, a tablet computer, a handheld computer, a wearable communication device, a gaming device, a virtual reality device, an augmented reality device, an extended reality device, an IoT device, a television, a soundbar, a stereo receiver, a home theater system, a set-top box, a streaming device, a casting stick, and/or another suitable device that can generate one or more haptic events.

As further shown in FIG. 1, the electronic device 110 may include a haptics mixer component 114 that can receive, generate, store, process, and/or provide information related to haptics mixing for concurrent haptic events. For example, in some aspects, the haptics mixer component 114 may receive (e.g., from the source device 120) a plurality of haptic signals associated with a plurality of haptic events, wherein the plurality of haptic events overlap in a time domain; may generate a mixed haptics signal that combines the plurality of haptic signals in a mechanical acceleration domain, wherein the mixed haptics signal preserves timing or synchronization information associated with the plurality of haptic signals; and/or may generate an output stream to be provided to a haptic actuator (e.g., the haptic device 112), wherein the output stream includes a PCM voltage signal based on the mixed haptics signal that combines the plurality of haptic signals.

The network 130 includes one or more wired and/or wireless networks. For example, the network 130 may include a cellular network (e.g., a Long-Term Evolution (LTE) network, a code division multiple access (CDMA) network, a 3G network, a 4G network, a 5G network, another type of next generation network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of the environment 100 may perform one or more functions described as being performed by another set of devices of the environment 100.

Figure 2:
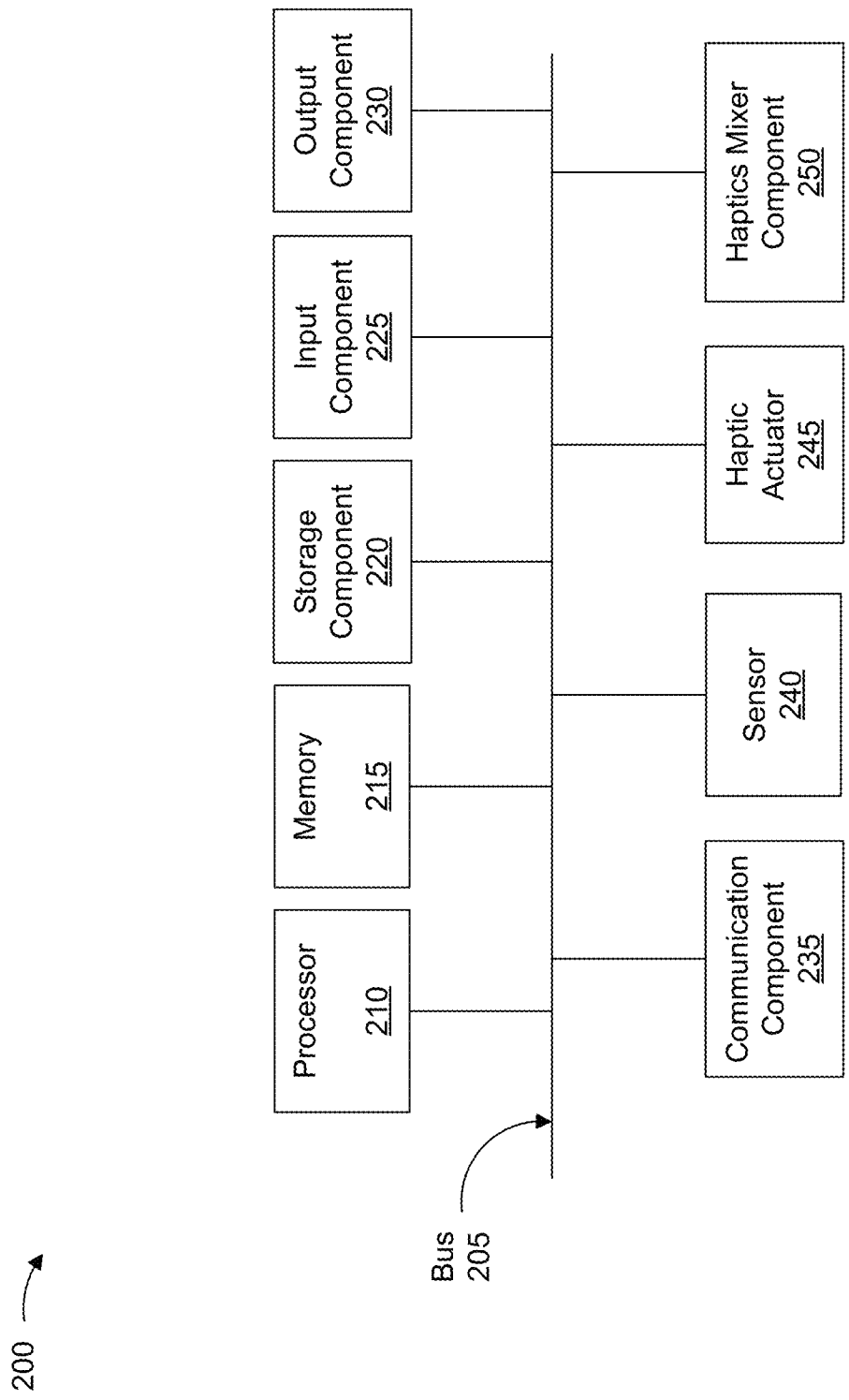
FIG. 2 is a diagram illustrating example components of one or more devices shown in FIG. 1, in accordance with the present disclosure.

FIG. 2 is a diagram illustrating example components of a device 200, in accordance with the present disclosure. The device 200 may correspond to electronic device 110 and/or source device 120. In some aspects, electronic device 110 and/or source device 120 may include one or more devices 200 and/or one or more components of the device 200. As shown in FIG. 2, the device 200 may include a bus 205, a processor 210, a memory 215, a storage component 220, an input component 225, an output component 230, a communication component 235, a sensor 240, a haptic actuator 245, and/or a haptics mixer component 250.

The bus 205 may include one or more components that enable wired and/or wireless communication among the components of the device 200. The bus 205 may couple together two or more components of FIG. 2, such as via operative coupling, communicative coupling, electronic coupling, and/or electric coupling. For example, the bus 205 may include an electrical connection (e.g., a wire, a trace, and/or a lead) and/or a wireless bus. The processor 210 may include a central processing unit, a graphics processing unit, a microprocessor, a controller, a microcontroller, a digital signal processor, a field-programmable gate array, an application-specific integrated circuit, and/or another type of processing component. The processor 210 may be implemented in hardware, firmware, or a combination of hardware and software. In some aspects, the processor 210 may include one or more processors capable of being programmed to perform one or more operations or processes described elsewhere herein.

The memory 215 may include volatile and/or nonvolatile memory. For example, the memory 215 may include random access memory (RAM), read only memory (ROM), a hard disk drive, and/or another type of memory (e.g., a flash memory, a magnetic memory, and/or an optical memory). The memory 215 may include internal memory (e.g., RAM, ROM, or a hard disk drive) and/or removable memory (e.g., removable via a universal serial bus connection). The memory 215 may be a non-transitory computer-readable medium. The memory 215 may store information, one or more instructions, and/or software (e.g., one or more software applications) related to the operation of the device 200. In some aspects, the memory 215 may include one or more memories that are coupled (e.g., communicatively coupled) to one or more processors (e.g., processor 210), such as via the bus 205. Communicative coupling between a processor 210 and a memory 215 may enable the processor 210 to read and/or process information stored in the memory 215 and/or to store information in the memory 215.

The storage component 220 may store information and/or software related to the operation and use of device 200. For example, the storage component 220 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 225 may enable the device 200 to receive input, such as user input and/or sensed input. For example, the input component 225 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 230 may enable the device 200 to provide output, such as via a display, a speaker, and/or a light-emitting diode. The communication component 235 may enable the device 200 to communicate with other devices via a wired connection and/or a wireless connection. For example, the communication component 235 may include a receiver, a transmitter, a transceiver, a modem, a network interface card, and/or an antenna.

The sensor 240 includes one or more wired or wireless devices capable of receiving, generating, storing, transmitting, processing, detecting, and/or providing information associated with a state of the device 200 and/or an environment surrounding the device 200, as described elsewhere herein. For example, the sensor 240 may include a touchscreen controller, a force sensor, a motion sensor, an accelerometer, a gyroscope, a proximity sensor, a light sensor, a noise sensor, a pressure sensor, an ultrasonic sensor, a positioning sensor, a capacitive sensor, a timing device, an infrared sensor, an active sensor (e.g., requiring an external power signal), a passive sensor (e.g., not requiring an external power signal), a biological or biometric sensor, a smoke sensor, a gas sensor, a chemical sensor, an alcohol sensor, a temperature sensor, a moisture sensor, a humidity sensor, a radioactive sensor, a magnetic sensor, an electromagnetic sensor, an analog sensor, and/or a digital sensor, among other examples. The sensor 240 may sense or detect a condition or information related to a state of the device 200 and/or an environment surrounding the device 200 and transmit, using a wired or wireless communication interface, an indication of the detected condition or information to other components of the device 200 and/or other devices.

The haptic actuator 245 includes one or more devices that may receive, generate, store, transmit, process, detect, and/or provide information associated with haptics mixing for concurrent haptic events, as described elsewhere herein. For example, the haptic actuator 245 may include a linear resonant actuator (LRA), an eccentric rotating mass (ERM) vibration motor, a piezoelectric actuator, an ultrasonic or electrostatic-friction-modulation surface actuator, and/or another suitable device or combination of devices configured to generate a vibrational waveform or other feedback with a distinct mechanical haptic pattern.

The haptics mixer component 250 includes one or more devices that may receive, generate, store, transmit, process, detect, and/or provide information associated with haptics mixing for concurrent haptic events, as described elsewhere herein. In some aspects, the haptics mixer component 250 may include a haptic actuator driver or other suitable device that can drive or otherwise control the haptic actuator 245. For example, in some aspects, the haptics mixer component 250 may receive a plurality of haptic signals associated with a plurality of haptic events, wherein the plurality of haptic events overlap in a time domain; generate a mixed haptics signal that combines the plurality of haptic signals in a mechanical acceleration domain, wherein the mixed haptics signal preserves timing or synchronization information associated with the plurality of haptic signals; and/or generate an output stream to be provided to the haptic actuator 245, wherein the output stream includes a PCM voltage signal based on the mixed haptics signal that combines the plurality of haptic signals.

The device 200 may perform one or more operations or processes described herein. For example, a non-transitory computer-readable medium (e.g., memory 215) may store a set of instructions (e.g., one or more instructions or code) for execution by the processor 210. The processor 210 may execute the set of instructions to perform one or more operations or processes described herein. In some aspects, execution of the set of instructions, by one or more processors 210, causes the one or more processors 210 and/or the device 200 to perform one or more operations or processes described herein. In some aspects, hardwired circuitry may be used instead of or in combination with the instructions to perform one or more operations or processes described herein. Additionally, or alternatively, the processor 210 may be configured to perform one or more operations or processes described herein. Thus, aspects described herein are not limited to any specific combination of hardware circuitry and software.

In some aspects, the device 200 may include means for receiving a plurality of haptic signals associated with a plurality of haptic events, wherein the plurality of haptic events overlap in a time domain; means for generating a mixed haptics signal that combines the plurality of haptic signals in a mechanical acceleration domain, wherein the mixed haptics signal preserves timing or synchronization information associated with the plurality of haptic signals; and/or means for generating an output stream to be provided to a haptic actuator, wherein the output stream includes a PCM voltage signal based on the mixed haptics signal that combines the plurality of haptic signals. In some aspects, the means for the device 200 to perform processes and/or operations described herein may include one or more components of the device 200 described in connection with FIG. 2, such as the bus 205, the processor 210, the memory 215, the storage component 220, the input component 225, the output component 230, the communication component 235, the sensor 240, the haptic actuator 245, the haptics mixer component 250, and/or any suitable combination thereof.

The number and arrangement of components shown in FIG. 2 are provided as an example. The device 200 may include additional components, fewer components, different components, or differently arranged components than those shown in FIG. 2. Additionally, or alternatively, a set of components (e.g., one or more components) of the device 200 may perform one or more functions described as being performed by another set of components of the device 200.

Figure 3:
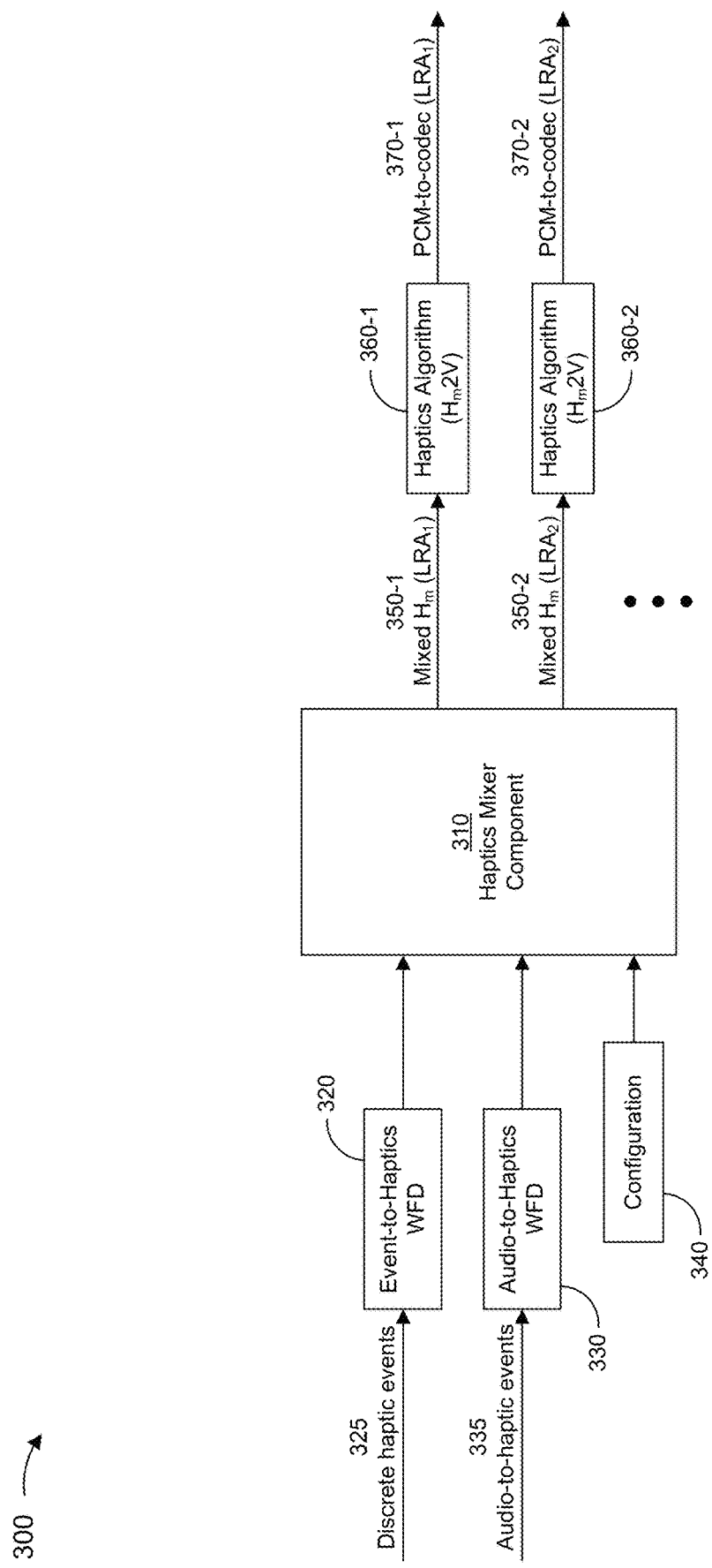
FIGS. 3-5 are diagrams illustrating examples associated with haptics mixing for concurrent haptic events, in accordance with the present disclosure.

FIG. 3 is a diagram illustrating an example 300 associated with haptics mixing for concurrent haptic events, in accordance with the present disclosure. As shown in FIG. 3, example 300 includes a haptics mixer component 310 that may generate one or more mixed haptics signals, $H_m$, based on a platform-independent format for a haptics waveform, referred to herein as a PCM_G format. In this way, by representing haptic events in a platform-independent format, the haptics mixer component 310 may mix two or more concurrent haptic signals (e.g., that fully or partially overlap in a time domain) using one or more haptics mixing algorithms to provide a consistent mixed haptics user experience across different haptics platforms.

In some aspects, as described herein, the haptics mixer component 310 may receive multiple haptic signals associated with multiple haptic events that overlap in a time domain. For example, in a haptic gaming environment, a first haptic event may correspond to a thunderstorm that is occurring in the background, which may be associated with a first haptic signal that includes many low-frequency vibrations that have a long duration that could last several seconds each. Furthermore, a second haptic event may correspond to action occurring in the foreground, such as a gunfight with many shots being fired, with each shot including a high-impulse burst that occurs each time that a user performs an interaction to pull a trigger. Accordingly, in some aspects, the haptics mixer component 310 may generally receive multiple haptic signals, including at least a first haptic signal and a second haptic signal, that fully or partially overlap in a time domain, and the haptics mixer component 310 may be configured to intelligently combine or mix the multiple haptic signals in a manner that reflects what the user expects to experience as feedback associated with the various haptic events.

Accordingly, as shown in FIG. 3 and described in further detail herein, the haptics mixer component 310 may receive multiple haptic signals associated with multiple haptic events that overlap in a time domain, where the multiple haptic signals may include any suitable concurrent and asynchronous haptic signals that are derived from predefined or parameterized haptic events and/or audio events. For example, as shown in FIG. 3, the haptics mixer component 310 may be coupled to an event-to-haptics WFD component 320 that may receive one or more discrete haptic events 325, which may correspond to one or more predefined haptic waveforms that originate from one or more sources. For example, in a gaming application, the discrete haptic events 325 may correspond to any suitable gaming event, such as an explosion, a gunshot, a jump, an item acquisition, a bomb blast, a car engine, a special effect, a thunder event, or the like. In another context, the discrete haptic events 325 may correspond to one or more alert haptics, such as a low battery event, a received short message service (SMS) events, a notification, a mobile device ringtone, or the like. In some aspects, the discrete haptic events 325 that are received by the event-to-haptics WFD component 320 may be associated with one or more descriptive WFD parameters, such as a scene position and/or a weighting, and the discrete haptic events 325 may be formatted as PWL acceleration-based segments or PCM acceleration-based segments. Additionally, or alternatively, as shown in FIG. 3, the haptics mixer component 310 may be coupled to an audio-to-haptics WFD component 330 that may receive one or more audio-to-haptic events 335 that are derived from one or more audio streams (e.g., a predefined audio stream or a runtime audio stream, such as a drum beat during a sustained bass event).

In some aspects, the haptics mixer component 310 may then generate a mixed haptics signal that combines the multiple haptic signals in a mechanical acceleration domain in a manner that preserves timing or synchronization information associated with the multiple haptic signals. For example, as described herein, the haptics mixer component 310 may receive a first haptic event, which may correspond to a discrete haptic event 325 and/or an audio-to-haptic event 335, and may receive a second haptic event, which may correspond to a discrete haptic event 325 and/or an audio-to-haptic event 335 that fully or partially overlaps with the first haptic event. In some aspects, the haptics mixer component 310 may then generate the mixed haptics signal that combines the multiple haptic signals in a mechanical acceleration domain based on one or more parameters associated with the multiple haptic events and configuration data that relates to a haptics platform (e.g., one or more haptic devices) coupled to the haptics mixer component 310. For example, in some aspects, the configuration data may include platform details such as a number of haptic devices that are supported by the haptics platform, OEM-programmable mounting locations for the haptic devices (e.g., to route multiple mixed haptic outputs to different LRAs or other haptic devices), configuration capabilities of the installed LRAs or other haptic devices, and/or mechanical installation and/or orientation information related to the installed LRAs or other haptic devices.

In some aspects, as shown in FIG. 3, the haptics mixer component 310 may generate an output stream that includes one or more mixed haptics signals 350, $H_m$, to be provided to one or more haptic actuators, such as one or more LRAs. For example, as described herein, the haptics mixer component 310 may generate the mixed haptics signals 350 in an LRA-independent mechanical acceleration format, using one or more haptics algorithms 360, where each mixed haptics signal 350 may include a PCM voltage signal 370 that is provided to a respective LRA based on the mixed haptics signal that combines the multiple (source) haptic signals. For example, in some aspects, the mixed haptics signals 350 may be generated in a manner that facilitates upstream mixing (e.g., by the one or more haptics algorithms 360), as each haptics event is handled independently from other concurrent haptics events 325 and/or audio-to-haptics events 335. In particular, the mixed haptics signals 350, $H_m$, are generated in a format that is independent of an LRA type or other haptics device type, and are therefore portable across different haptics platforms. Furthermore, as shown, the haptics mixer component 310 may support multiple output streams (e.g., one output stream per destination LRA or destination haptic device) in cases where the haptics platform includes multiple LRAs or haptic devices. For example, the haptics mixer component 310 may generate a first output stream including a first mixed haptics signal 350-1, which may be processed by a first haptics algorithm 360-1 to generate a first PCM signal 370-1 that is formatted in accordance with a codec associated with a first LRA, a second output stream including a second mixed haptics signal 350-2, which may processed by a second haptics algorithm 360-2 to generate a second PCM signal 370-2 that is formatted in accordance with a codec associated with a second LRA, and so on.

As indicated above, FIG. 3 is provided as an example. Other examples may differ from what is described with regard to FIG. 3. The number and arrangement of devices shown in FIG. 3 are provided as an example. In practice, there may be additional devices, fewer devices, different devices, or differently arranged devices than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) shown in FIG. 3 may perform one or more functions described as being performed by another set of devices shown in FIG. 3.

Figure 4:
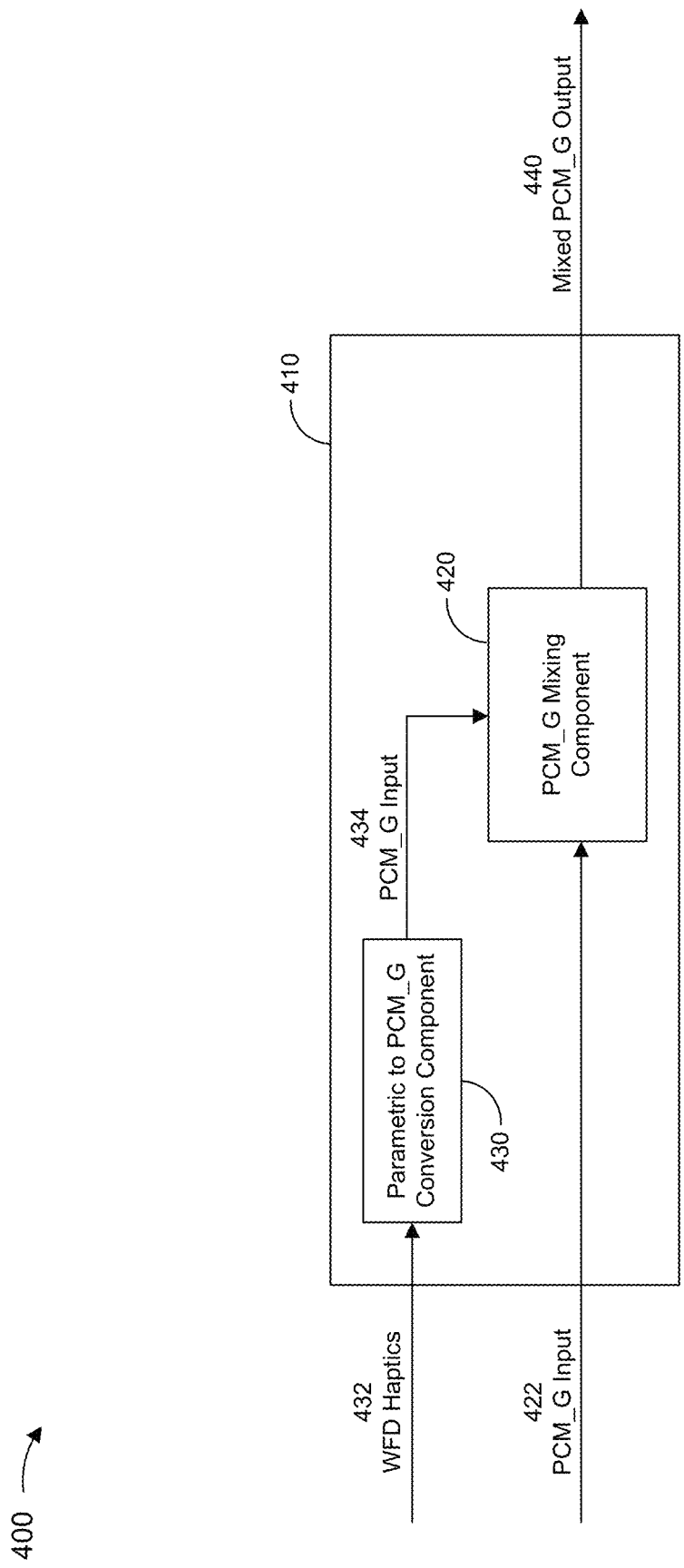

FIG. 4 is a diagram illustrating an example 400 associated with haptics mixing for concurrent haptic events, in accordance with the present disclosure. As shown in FIG. 4, example 400 includes a haptics mixer component 410, which includes a mixing component 420 for mixing multiple PCM_G inputs corresponding to multiple haptic signals, and a conversion component 430 for converting a WFD haptics signal to a PCM_G input. For example, as described herein, a PCM_G input may generally correspond to a platform-agnostic signal in a mechanical acceleration domain, which may preserve timing and synchronization information for multiple haptics events. Accordingly, in some aspects, the mixing component 420 may receive one or more PCM_G inputs 422, and the conversion component 430 may receive one or more WFD haptics inputs 432 that may be converted into PCM_G inputs 434 that are provided to the mixing component 420 to generate a mixed haptics signal that combines the PCM_G inputs 422, 434 in a mechanical acceleration domain in a manner that preserves timing or synchronization information.

For example, in some aspects, each PCM_G inputs 422, 434 may be associated with a channel information data structure that is compatible with an application program interface (API) supported by the mixing component 420. For example, the channel information data structure associated with each of the PCM_G inputs 422, 434 may include an event type field to indicate whether the PCM_G input 422, 434 is associated with a parameterized haptic event or an audio-to-haptic event, a weighting value associated with a haptic channel, a selected haptic mixing algorithm, a set of coordinates (e.g., Cartesian coordinates of the haptic event in x, y, and z axes, which may be useful in scaling and/or directional haptics when the haptics platform includes multiple LRAs or haptic actuators), an optional PWL field to indicate a PWL representation of a haptic event (e.g., according to time and amplitude pairs), and/or audio stream information (e.g., a sample rate and/or beats per second).

Accordingly, as described herein, the mixing component 420 may receive multiple PCM_G inputs 422, 434, and may use a suitable mixing algorithm (e.g., selected as a parameter of the PCM_G inputs 422, 434) to provide flexibility in a haptics mixing configuration that is used to generate a mixed PCM_G output 440. For example, the available mixing algorithms may generally be time-independent, and may enable multiple waveforms, corresponding to different haptics signals, to be combined according to any suitable time relationship. For example, in some aspects, the mixing component 420 may be configured to use an overlay algorithm to generate the mixed PCM_G output 440, where each PCM_G input 422, 434 may correspond to a waveform with an acceleration value, $A_n$, and a weighting, $W_n$, for each time instant, Tn. Accordingly, when the overlay algorithm is used, the mixing component 420 may generate the mixed PCM_G output 440 such that, for any given time instant $T_n$ associated with concurrent accelerations $A_1, A_2, \ldots A_n$, with weightings $W_1, W_2, \ldots W_n$, the mixed PCM_G output 440 is a maximum of $(W_1*A_1, W_2*A_2, \ldots W_n*A_n)$. Additionally, or alternatively, the mixing component 420 may use a weighted sum algorithm to generate the mixed PCM_G output 440 such that, for any given time instant $T_n$ associated with concurrent accelerations $A_1, A_2, \ldots A_n$, with weightings $W_1, W_2, \ldots W_n$, the mixed PCM_G output 440 is $W_1*A_1, W_2*A_2, \ldots W_n*A_n$. Additionally, or alternatively, the mixing component 420 may use a weighted average algorithm to generate the mixed PCM_G output 440 such that, for any given time instant $T_n$ associated with concurrent accelerations $A_1, A_2, \ldots A_n$, with weightings $W_1, W_2, \ldots W_n$, the mixed PCM_G output 440 is $(W_1*A_1, W_2*A_2, \ldots W_n*A_n)/(W_1+W_2+ \ldots W_n)$.

As indicated above, FIG. 4 is provided as an example. Other examples may differ from what is described with regard to FIG. 4. The number and arrangement of devices shown in FIG. 4 are provided as an example. In practice, there may be additional devices, fewer devices, different devices, or differently arranged devices than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) shown in FIG. 4 may perform one or more functions described as being performed by another set of devices shown in FIG. 4.

Figure 5:
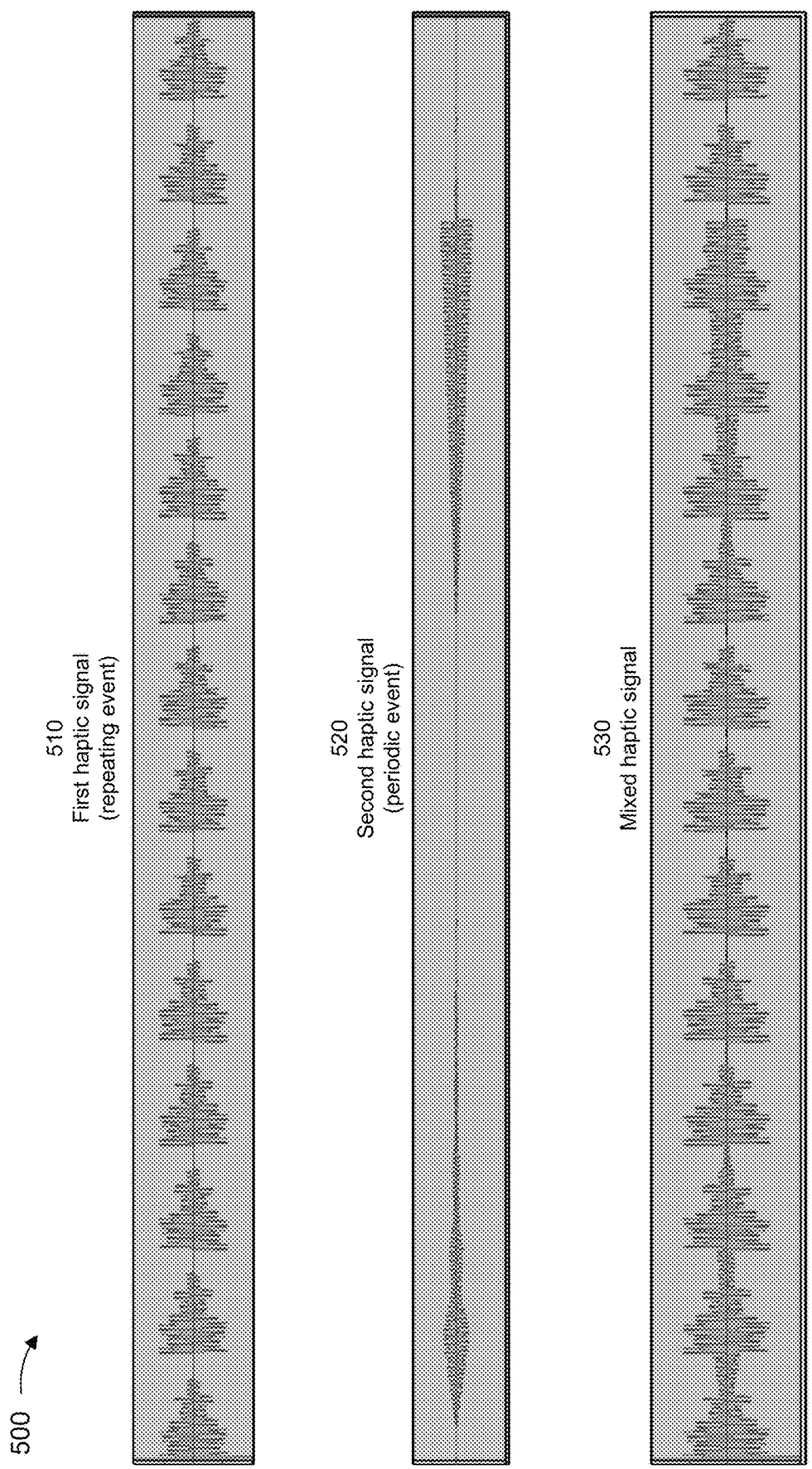

FIG. 5 is a diagram illustrating an example 500 associated with haptics mixing for concurrent haptic events, in accordance with the present disclosure. As shown in FIG. 5, example 500 includes a first haptic signal 510 that may be combined or mixed with a second haptic signal 520 to generate a mixed haptic signal 530 that preserves timing or synchronization information associated with the first haptic signal 510 and the second haptic signal 520. For example, as described herein, the mixed haptic signal 530 may be generated using one or more techniques described in further detail above with respect to FIG. 3 and/or FIG. 4. For example, the mixed haptic signal 530 may be generated using an overlay algorithm, a weighted sum algorithm, and/or a weighted average algorithm that generates an output at any given time instant based on a concurrent acceleration and weighting associated with the haptic signals being mixed.

For example, referring to FIG. 5, the first haptic signal 510 may correspond to a repeating event, such as a repeating gunshot in a gaming application, and the second haptic signal 520 may correspond to a longer periodic event, such as a thunder event. As further shown, the mixed haptic signal 530 combines the first haptic signal 510 and the second haptic signal 520 to create the mixed haptic signal 530 with a precise and intuitive tactile feel. For example, as shown, during one or more active or low amplitude time periods of the first haptic signal 510, a waveform of the mixed haptic signal 530 includes an amplitude that is based on the waveform of the second haptic signal 520. Furthermore, during time periods of the first haptic signal 510 associated with a high amplitude, the first haptic signal 510 is shown as overriding the low amplitude portions of the second haptic signal 520. Accordingly, as described herein, the mixed haptic signal 530 may combine the first haptic signal 510 and the second haptic signal 520 using the overlay algorithm, the weighted sum algorithm, and/or the weighted average algorithm to create the mixed haptic signal 530.

As indicated above, FIG. 5 is provided as an example. Other examples may differ from what is described with regard to FIG. 5. The number and arrangement of devices shown in FIG. 5 are provided as an example. In practice, there may be additional devices, fewer devices, different devices, or differently arranged devices than those shown in FIG. 5. Furthermore, two or more devices shown in FIG. 5 may be implemented within a single device, or a single device shown in FIG. 5 may be implemented as multiple, distributed devices. Additionally, or alternatively, a set of devices (e.g., one or more devices) shown in FIG. 5 may perform one or more functions described as being performed by another set of devices shown in FIG. 5.

Figure 6:
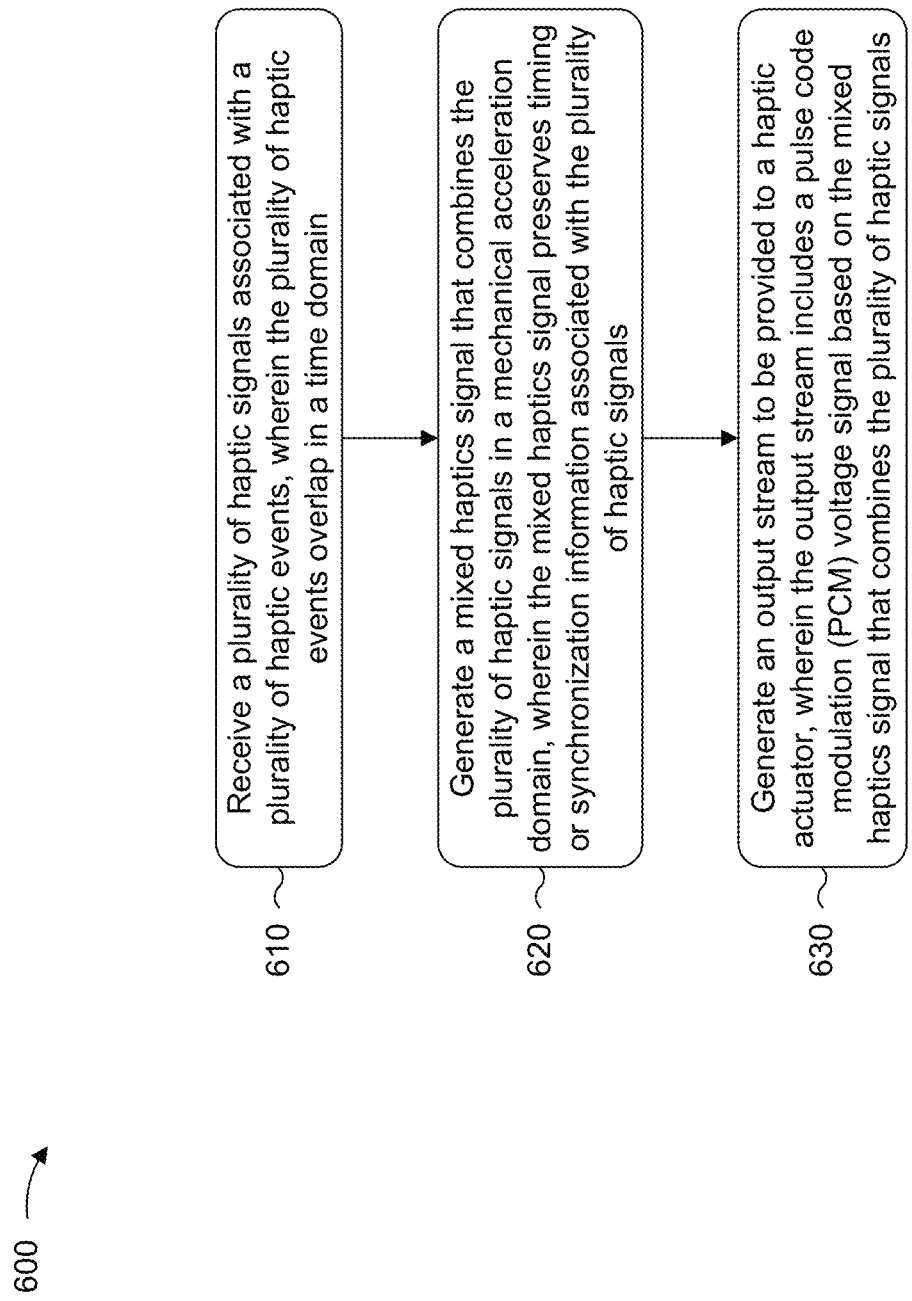
FIG. 6 is a flowchart of an example process associated with haptics mixing for concurrent haptic events, in accordance with the present disclosure.

FIG. 6 is a flowchart of an example process 600 associated with haptics mixing for concurrent haptic events, in accordance with the present disclosure. In some aspects, one or more process blocks of FIG. 6 are performed by an electronic device (e.g., electronic device 110, device 200, haptics mixer component 310, haptics mixer component 410, or the like). In some aspects, one or more process blocks of FIG. 6 are performed by another device or a group of devices separate from or including the electronic device, such as the source device 120 or another suitable device. Additionally, or alternatively, one or more process blocks of FIG. 6 may be performed by one or more components of device 200, such as processor 210, memory 215, storage component 220, input component 225, output component 230, communication component 235, sensor 240, haptic actuator 245, and/or haptics mixer component 250.

As shown in FIG. 6, process 600 may include receiving a plurality of haptic signals associated with a plurality of haptic events, wherein the plurality of haptic events overlap in a time domain (block 610). For example, the electronic device may receive a plurality of haptic signals associated with a plurality of haptic events, wherein the plurality of haptic events overlap in a time domain, as described above.

As further shown in FIG. 6, process 600 may include generating a mixed haptics signal that combines the plurality of haptic signals in a mechanical acceleration domain, wherein the mixed haptics signal preserves timing or synchronization information associated with the plurality of haptic signals (block 620). For example, the electronic device may generate a mixed haptics signal that combines the plurality of haptic signals in a mechanical acceleration domain, wherein the mixed haptics signal preserves timing or synchronization information associated with the plurality of haptic signals, as described above.

As further shown in FIG. 6, process 600 may include generating an output stream to be provided to a haptic actuator, wherein the output stream includes a PCM voltage signal based on the mixed haptics signal that combines the plurality of haptic signals (block 630). For example, the electronic device may generate an output stream to be provided to a haptic actuator, wherein the output stream includes a PCM voltage signal based on the mixed haptics signal that combines the plurality of haptic signals, as described above.

Process 600 may include additional aspects, such as any single aspect or any combination of aspects described below and/or in connection with one or more other processes described elsewhere herein.

In a first aspect, one or more haptic events, of the plurality of haptic events, is a discrete haptic event associated with a haptic waveform associated with one or more WFD parameters.

In a second aspect, alone or in combination with the first aspect, one or more haptic events, of the plurality of haptic events, is an audio-to-haptic event associated with an audio stream.

In a third aspect, alone or in combination with one or more of the first and second aspects, process 600 includes receiving a second plurality of haptic signals associated with a second plurality of haptic events that overlap in the time domain, generating a second mixed haptics signal that combines the second plurality of haptic signals in the mechanical acceleration domain, wherein the second mixed haptics signal preserves timing or synchronization information associated with the second plurality of haptic signals, and generating a second output stream to be provided to a second haptic actuator, wherein the second output stream includes a second PCM voltage signal based on the second mixed haptics signal that combines the second plurality of haptic signals.

In a fourth aspect, alone or in combination with one or more of the first through third aspects, the plurality of haptic signals are combined to generate the mixed haptics signal in the mechanical acceleration domain based on configuration data that includes one or more parameters related to the haptic actuator.

In a fifth aspect, alone or in combination with one or more of the first through fourth aspects, the mixed haptics signal is generated using an overlay algorithm such that the mixed haptics signal includes, for each time instant during which the plurality of haptic events overlap in the time domain, an amplitude that corresponds to a maximum value of an acceleration parameter multiplied by a weighting parameter across the plurality of haptic signals.

In a sixth aspect, alone or in combination with one or more of the first through fifth aspects, the mixed haptics signal is generated using a weighted sum algorithm such that the mixed haptics signal includes, for each time instant during which the plurality of haptic events overlap in the time domain, an amplitude that corresponds to a sum of an acceleration parameter multiplied by a weighting parameter across the plurality of haptic signals.

In a seventh aspect, alone or in combination with one or more of the first through sixth aspects, the mixed haptics signal is generated using a weighted average algorithm such that the mixed haptics signal includes, for each time instant during which the plurality of haptic events overlap in the time domain, an amplitude that corresponds to a first sum of an acceleration parameter multiplied by a weighting parameter across the plurality of haptic signals divided by a second sum based on the weighting parameter across the plurality of haptic signals.

Although FIG. 6 shows example blocks of process 600, in some aspects, process 600 includes additional blocks, fewer blocks, different blocks, or differently arranged blocks than those depicted in FIG. 6. Additionally, or alternatively, two or more of the blocks of process 600 may be performed in parallel.

The following provides an overview of some Aspects of the present disclosure:

- Aspect 1: A method for haptics mixing by an electronic device, comprising: receiving a plurality of haptic signals associated with a plurality of haptic events, wherein the plurality of haptic events overlap in a time domain; generating a mixed haptics signal that combines the plurality of haptic signals in a mechanical acceleration domain, wherein the mixed haptics signal preserves timing or synchronization information associated with the plurality of haptic signals; and generating an output stream to be provided to a haptic actuator, wherein the output stream includes a PCM voltage signal based on the mixed haptics signal that combines the plurality of haptic signals.
- Aspect 2: The method of Aspect 1, wherein one or more haptic events, of the plurality of haptic events, is a discrete haptic event associated with a haptic waveform associated with one or more WFD parameters.
- Aspect 3: The method of any of Aspects 1-2, wherein one or more haptic events, of the plurality of haptic events, is an audio-to-haptic event associated with an audio stream.
- Aspect 4: The method of any of Aspects 1-3, further comprising: receiving a second plurality of haptic signals associated with a second plurality of haptic events that overlap in the time domain; generating a second mixed haptics signal that combines the second plurality of haptic signals in the mechanical acceleration domain, wherein the second mixed haptics signal preserves timing or synchronization information associated with the second plurality of haptic signals; and generating a second output stream to be provided to a second haptic actuator, wherein the second output stream includes a second PCM voltage signal based on the second mixed haptics signal that combines the second plurality of haptic signals.

Aspect 5: The method of any of Aspects 1-4, wherein the plurality of haptic signals are combined to generate the mixed haptics signal in the mechanical acceleration domain based on configuration data that includes one or more parameters related to the haptic actuator.

Aspect 6: The method of any of Aspects 1-5, wherein the mixed haptics signal is generated using an overlay algorithm such that the mixed haptics signal includes, for each time instant during which the plurality of haptic events overlap in the time domain, an amplitude that corresponds to a maximum value of an acceleration parameter multiplied by a weighting parameter across the plurality of haptic signals.

Aspect 7: The method of any of Aspects 1-6, wherein the mixed haptics signal is generated using a weighted sum algorithm such that the mixed haptics signal includes, for each time instant during which the plurality of haptic events overlap in the time domain, an amplitude that corresponds to a sum of an acceleration parameter multiplied by a weighting parameter across the plurality of haptic signals.

Aspect 8: The method of any of Aspects 1-7, wherein the mixed haptics signal is generated using a weighted average algorithm such that the mixed haptics signal includes, for each time instant during which the plurality of haptic events overlap in the time domain, an amplitude that corresponds to a first sum of an acceleration parameter multiplied by a weighting parameter across the plurality of haptic signals divided by a second sum based on the weighting parameter across the plurality of haptic signals.

Aspect 9: An electronic device for wireless communication, comprising: one or more memories; and one or more processors, coupled to the one or more memories, configured to cause the electronic device to: receive a plurality of haptic signals associated with a plurality of haptic events, wherein the plurality of haptic events overlap in a time domain; generate a mixed haptics signal that combines the plurality of haptic signals in a mechanical acceleration domain, wherein the mixed haptics signal preserves timing or synchronization information associated with the plurality of haptic signals; and generate an output stream to be provided to a haptic actuator, wherein the output stream includes a PCM voltage signal based on the mixed haptics signal that combines the plurality of haptic signals.

Aspect 10: The electronic device of Aspect 9, wherein one or more haptic events, of the plurality of haptic events, is a discrete haptic event associated with a haptic waveform associated with one or more WFD parameters.

Aspect 11: The electronic device of any of Aspects 9-10, wherein one or more haptic events, of the plurality of haptic events, is an audio-to-haptic event associated with an audio stream.

Aspect 12: The electronic device of any of Aspects 9-11, wherein the one or more processors are further configured to cause the electronic device to: receive a second plurality of haptic signals associated with a second plurality of haptic events that overlap in the time domain; generate a second mixed haptics signal that combines the second plurality of haptic signals in the mechanical acceleration domain, wherein the second mixed haptics signal preserves timing or synchronization information associated with the second plurality of haptic signals; and generate a second output stream to be provided to a second haptic actuator, wherein the second output stream includes a second PCM voltage signal based on the second mixed haptics signal that combines the second plurality of haptic signals.

Aspect 13: The electronic device of any of Aspects 9-12, wherein the plurality of haptic signals are combined to generate the mixed haptics signal in the mechanical acceleration domain based on configuration data that includes one or more parameters related to the haptic actuator.

Aspect 14: The electronic device of any of Aspects 9-13, wherein the mixed haptics signal is generated using an overlay algorithm such that the mixed haptics signal includes, for each time instant during which the plurality of haptic events overlap in the time domain, an amplitude that corresponds to a maximum value of an acceleration parameter multiplied by a weighting parameter across the plurality of haptic signals.

Aspect 15: The electronic device of any of Aspects 9-14, wherein the mixed haptics signal is generated using a weighted sum algorithm such that the mixed haptics signal includes, for each time instant during which the plurality of haptic events overlap in the time domain, an amplitude that corresponds to a sum of an acceleration parameter multiplied by a weighting parameter across the plurality of haptic signals.

Aspect 16: The electronic device of any of Aspects 9-15, wherein the mixed haptics signal is generated using a weighted average algorithm such that the mixed haptics signal includes, for each time instant during which the plurality of haptic events overlap in the time domain, an amplitude that corresponds to a first sum of an acceleration parameter multiplied by a weighting parameter across the plurality of haptic signals divided by a second sum based on the weighting parameter across the plurality of haptic signals.

Aspect 17: A non-transitory computer-readable medium storing a set of instructions for wireless communication, the set of instructions comprising: one or more instructions that, when executed by one or more processors of an electronic device, cause the electronic device to: receive a plurality of haptic signals associated with a plurality of haptic events, wherein the plurality of haptic events overlap in a time domain; generate a mixed haptics signal that combines the plurality of haptic signals in a mechanical acceleration domain, wherein the mixed haptics signal preserves timing or synchronization information associated with the plurality of haptic signals; and generate an output stream to be provided to a haptic actuator, wherein the output stream includes a PCM voltage signal based on the mixed haptics signal that combines the plurality of haptic signals.

Aspect 18: The non-transitory computer-readable medium of Aspect 17, wherein one or more haptic events, of the plurality of haptic events, is a discrete haptic event associated with a haptic waveform associated with one or more WFD parameters.

Aspect 19: The non-transitory computer-readable medium of any of Aspects 17-18, wherein one or more haptic events, of the plurality of haptic events, is an audio-to-haptic event associated with an audio stream.

Aspect 20: The non-transitory computer-readable medium of any of Aspects 17-19, wherein the one or more instructions further cause the electronic device to: receive a second plurality of haptic signals associated with a second plurality of haptic events that overlap in the time domain; generate a second mixed haptics signal that combines the second plurality of haptic signals in the mechanical acceleration domain, wherein the second mixed haptics signal preserves timing or synchronization information associated with the second plurality of haptic signals; and generate a second output stream to be provided to a second haptic actuator, wherein the second output stream includes a second PCM voltage signal based on the second mixed haptics signal that combines the second plurality of haptic signals.

Aspect 21: The non-transitory computer-readable medium of any of Aspects 17-20, wherein the plurality of haptic signals are combined to generate the mixed haptics signal in the mechanical acceleration domain based on configuration data that includes one or more parameters related to the haptic actuator.

Aspect 22: The non-transitory computer-readable medium of any of Aspects 17-21, wherein the mixed haptics signal is generated using an overlay algorithm such that the mixed haptics signal includes, for each time instant during which the plurality of haptic events overlap in the time domain, an amplitude that corresponds to a maximum value of an acceleration parameter multiplied by a weighting parameter across the plurality of haptic signals.

Aspect 23: The non-transitory computer-readable medium of any of Aspects 17-22, wherein the mixed haptics signal is generated using a weighted sum algorithm such that the mixed haptics signal includes, for each time instant during which the plurality of haptic events overlap in the time domain, an amplitude that corresponds to a sum of an acceleration parameter multiplied by a weighting parameter across the plurality of haptic signals.

Aspect 24: The non-transitory computer-readable medium of any of Aspects 17-23, wherein the mixed haptics signal is generated using a weighted average algorithm such that the mixed haptics signal includes, for each time instant during which the plurality of haptic events overlap in the time domain, an amplitude that corresponds to a first sum of an acceleration parameter multiplied by a weighting parameter across the plurality of haptic signals divided by a second sum based on the weighting parameter across the plurality of haptic signals.

Aspect 25: An apparatus for wireless communication, comprising: means for receiving a plurality of haptic signals associated with a plurality of haptic events, wherein the plurality of haptic events overlap in a time domain; means for generating a mixed haptics signal that combines the plurality of haptic signals in a mechanical acceleration domain, wherein the mixed haptics signal preserves timing or synchronization information associated with the plurality of haptic signals; and means for generating an output stream to be provided to a haptic actuator, wherein the output stream includes a PCM voltage signal based on the mixed haptics signal that combines the plurality of haptic signals.

Aspect 26: The apparatus of Aspect 25, wherein one or more haptic events, of the plurality of haptic events, is a discrete haptic event associated with a haptic waveform associated with one or more WFD parameters.

Aspect 27: The apparatus of any of Aspects 25-26, wherein one or more haptic events, of the plurality of haptic events, is an audio-to-haptic event associated with an audio stream.

Aspect 28: The apparatus of any of Aspects 25-27, further comprising: means for receiving a second plurality of haptic signals associated with a second plurality of haptic events that overlap in the time domain; means for generating a second mixed haptics signal that combines the second plurality of haptic signals in the mechanical acceleration domain, wherein the second mixed haptics signal preserves timing or synchronization information associated with the second plurality of haptic signals; and means for generating a second output stream to be provided to a second haptic actuator, wherein the second output stream includes a second PCM voltage signal based on the second mixed haptics signal that combines the second plurality of haptic signals.

Aspect 29: The apparatus of any of Aspects 25-28, wherein the plurality of haptic signals are combined to generate the mixed haptics signal in the mechanical acceleration domain based on configuration data that includes one or more parameters related to the haptic actuator.

Aspect 30: The apparatus of any of Aspects 25-29, wherein the mixed haptics signal is generated using an overlay algorithm, a weighted sum algorithm, or a weighted average algorithm.

Aspect 31: A system configured to perform one or more operations recited in one or more of Aspects 1-30.

Aspect 32: An apparatus comprising means for performing one or more operations recited in one or more of Aspects 1-30.

Aspect 33: A non-transitory computer-readable medium storing a set of instructions, the set of instructions comprising one or more instructions that, when executed by a device, cause the device to perform one or more operations recited in one or more of Aspects 1-30.

Aspect 34: A computer program product comprising instructions or code for executing one or more operations recited in one or more of Aspects 1-30.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method for haptics mixing by an electronic device, comprising:
   receiving a plurality of haptic signals associated with a plurality of haptic events, wherein the plurality of haptic events overlap in a time domain;
   generating a mixed haptics signal that combines the plurality of haptic signals in a mechanical acceleration domain, wherein the mixed haptics signal preserves timing or synchronization information associated with the plurality of haptic signals; and
   generating an output stream to be provided to a haptic actuator, wherein the output stream includes a pulse code modulation (PCM) voltage signal based on the mixed haptics signal that combines the plurality of haptic signals.

2. The method of claim 1, wherein one or more haptic events, of the plurality of haptic events, is a discrete haptic event associated with a haptic waveform associated with one or more waveform designer (WFD) parameters.

3. The method of claim 1, wherein one or more haptic events, of the plurality of haptic events, is an audio-to-haptic event associated with an audio stream.

4. The method of claim 1, further comprising:
   receiving a second plurality of haptic signals associated with a second plurality of haptic events that overlap in the time domain;
   generating a second mixed haptics signal that combines the second plurality of haptic signals in the mechanical acceleration domain, wherein the second mixed haptics signal preserves timing or synchronization information associated with the second plurality of haptic signals; and
   generating a second output stream to be provided to a second haptic actuator, wherein the second output stream includes a second PCM voltage signal based on the second mixed haptics signal that combines the second plurality of haptic signals.

5. The method of claim 1, wherein the plurality of haptic signals are combined to generate the mixed haptics signal in the mechanical acceleration domain based on configuration data that includes one or more parameters related to the haptic actuator.

6. The method of claim 1, wherein the mixed haptics signal is generated using an overlay algorithm such that the mixed haptics signal includes, for each time instant during which the plurality of haptic events overlap in the time domain, an amplitude that corresponds to a maximum value of an acceleration parameter multiplied by a weighting parameter across the plurality of haptic signals.

7. The method of claim 1, wherein the mixed haptics signal is generated using a weighted sum algorithm such that the mixed haptics signal includes, for each time instant during which the plurality of haptic events overlap in the time domain, an amplitude that corresponds to a sum of an acceleration parameter multiplied by a weighting parameter across the plurality of haptic signals.

8. The method of claim 1, wherein the mixed haptics signal is generated using a weighted average algorithm such that the mixed haptics signal includes, for each time instant during which the plurality of haptic events overlap in the time domain, an amplitude that corresponds to a first sum of an acceleration parameter multiplied by a weighting parameter across the plurality of haptic signals divided by a second sum based on the weighting parameter across the plurality of haptic signals.

9. An electronic device for wireless communication, comprising:
   one or more memories; and
   one or more processors, coupled to the one or more memories, configured to cause the electronic device to:
   receive a plurality of haptic signals associated with a plurality of haptic events, wherein the plurality of haptic events overlap in a time domain;
   generate a mixed haptics signal that combines the plurality of haptic signals in a mechanical acceleration domain, wherein the mixed haptics signal preserves timing or synchronization information associated with the plurality of haptic signals; and generate an output stream to be provided to a haptic actuator, wherein the output stream includes a pulse code modulation (PCM) voltage signal based on the mixed haptics signal that combines the plurality of haptic signals.

10. The electronic device of claim 9, wherein one or more haptic events, of the plurality of haptic events, is a discrete haptic event associated with a haptic waveform associated with one or more waveform designer (WFD) parameters.

11. The electronic device of claim 9, wherein one or more haptic events, of the plurality of haptic events, is an audio-to-haptic event associated with an audio stream.

12. The electronic device of claim 9, wherein the one or more processors are further configured to cause the electronic device to:
receive a second plurality of haptic signals associated with a second plurality of haptic events that overlap in the time domain;
generate a second mixed haptics signal that combines the second plurality of haptic signals in the mechanical acceleration domain, wherein the second mixed haptics signal preserves timing or synchronization information associated with the second plurality of haptic signals; and
generate a second output stream to be provided to a second haptic actuator, wherein the second output stream includes a second PCM voltage signal based on the second mixed haptics signal that combines the second plurality of haptic signals.

13. The electronic device of claim 9, wherein the plurality of haptic signals are combined to generate the mixed haptics signal in the mechanical acceleration domain based on configuration data that includes one or more parameters related to the haptic actuator.

14. The electronic device of claim 9, wherein the mixed haptics signal is generated using an overlay algorithm such that the mixed haptics signal includes, for each time instant during which the plurality of haptic events overlap in the time domain, an amplitude that corresponds to a maximum value of an acceleration parameter multiplied by a weighting parameter across the plurality of haptic signals.

15. The electronic device of claim 9, wherein the mixed haptics signal is generated using a weighted sum algorithm such that the mixed haptics signal includes, for each time instant during which the plurality of haptic events overlap in the time domain, an amplitude that corresponds to a sum of an acceleration parameter multiplied by a weighting parameter across the plurality of haptic signals.

16. The electronic device of claim 9, wherein the mixed haptics signal is generated using a weighted average algorithm such that the mixed haptics signal includes, for each time instant during which the plurality of haptic events overlap in the time domain, an amplitude that corresponds to a first sum of an acceleration parameter multiplied by a weighting parameter across the plurality of haptic signals divided by a second sum based on the weighting parameter across the plurality of haptic signals.

17. A non-transitory computer-readable medium storing a set of instructions for wireless communication, the set of instructions comprising:
one or more instructions that, when executed by one or more processors of an electronic device, cause the electronic device to:
receive a plurality of haptic signals associated with a plurality of haptic events, wherein the plurality of haptic events overlap in a time domain;
generate a mixed haptics signal that combines the plurality of haptic signals in a mechanical acceleration domain, wherein the mixed haptics signal preserves timing or synchronization information associated with the plurality of haptic signals; and
generate an output stream to be provided to a haptic actuator, wherein the output stream includes a pulse code modulation (PCM) voltage signal based on the mixed haptics signal that combines the plurality of haptic signals.

18. The non-transitory computer-readable medium of claim 17, wherein one or more haptic events, of the plurality of haptic events, is a discrete haptic event associated with a haptic waveform associated with one or more waveform designer (WFD) parameters.

19. The non-transitory computer-readable medium of claim 17, wherein one or more haptic events, of the plurality of haptic events, is an audio-to-haptic event associated with an audio stream.

20. The non-transitory computer-readable medium of claim 17, wherein the one or more instructions further cause the electronic device to:
receive a second plurality of haptic signals associated with a second plurality of haptic events that overlap in the time domain;
generate a second mixed haptics signal that combines the second plurality of haptic signals in the mechanical acceleration domain, wherein the second mixed haptics signal preserves timing or synchronization information associated with the second plurality of haptic signals; and
generate a second output stream to be provided to a second haptic actuator, wherein the second output stream includes a second PCM voltage signal based on the second mixed haptics signal that combines the second plurality of haptic signals.

21. The non-transitory computer-readable medium of claim 17, wherein the plurality of haptic signals are combined to generate the mixed haptics signal in the mechanical acceleration domain based on configuration data that includes one or more parameters related to the haptic actuator.

22. The non-transitory computer-readable medium of claim 17, wherein the mixed haptics signal is generated using an overlay algorithm such that the mixed haptics signal includes, for each time instant during which the plurality of haptic events overlap in the time domain, an amplitude that corresponds to a maximum value of an acceleration parameter multiplied by a weighting parameter across the plurality of haptic signals.

23. The non-transitory computer-readable medium of claim 17, wherein the mixed haptics signal is generated using a weighted sum algorithm such that the mixed haptics signal includes, for each time instant during which the plurality of haptic events overlap in the time domain, an amplitude that corresponds to a sum of an acceleration parameter multiplied by a weighting parameter across the plurality of haptic signals.

24. The non-transitory computer-readable medium of claim 17, wherein the mixed haptics signal is generated using a weighted average algorithm such that the mixed haptics signal includes, for each time instant during which the plurality of haptic events overlap in the time domain, an amplitude that corresponds to a first sum of an acceleration parameter multiplied by a weighting parameter across the plurality of haptic signals divided by a second sum based on the weighting parameter across the plurality of haptic signals.

25. An apparatus for wireless communication, comprising:
- means for receiving a plurality of haptic signals associated with a plurality of haptic events, wherein the plurality of haptic events overlap in a time domain;
- means for generating a mixed haptics signal that combines the plurality of haptic signals in a mechanical acceleration domain, wherein the mixed haptics signal preserves timing or synchronization information associated with the plurality of haptic signals; and
- means for generating an output stream to be provided to a haptic actuator, wherein the output stream includes a pulse code modulation (PCM) voltage signal based on the mixed haptics signal that combines the plurality of haptic signals.

26. The apparatus of claim 25, wherein one or more haptic events, of the plurality of haptic events, is a discrete haptic event associated with a haptic waveform associated with one or more waveform designer (WFD) parameters.

27. The apparatus of claim 25, wherein one or more haptic events, of the plurality of haptic events, is an audio-to-haptic event associated with an audio stream.

28. The apparatus of claim 25, further comprising:
- means for receiving a second plurality of haptic signals associated with a second plurality of haptic events that overlap in the time domain;
- means for generating a second mixed haptics signal that combines the second plurality of haptic signals in the mechanical acceleration domain, wherein the second mixed haptics signal preserves timing or synchronization information associated with the second plurality of haptic signals; and
- means for generating a second output stream to be provided to a second haptic actuator, wherein the second output stream includes a second PCM voltage signal based on the second mixed haptics signal that combines the second plurality of haptic signals.

29. The apparatus of claim 25, wherein the plurality of haptic signals are combined to generate the mixed haptics signal in the mechanical acceleration domain based on configuration data that includes one or more parameters related to the haptic actuator.

30. The apparatus of claim 25, wherein the mixed haptics signal is generated using an overlay algorithm, a weighted sum algorithm, or a weighted average algorithm.

* * * * *